No. 731,977. PATENTED JUNE 23, 1903.
S. I. TITUS.
REVOLVING CULTIVATOR.
APPLICATION FILED JUNE 20, 1902.
NO MODEL.
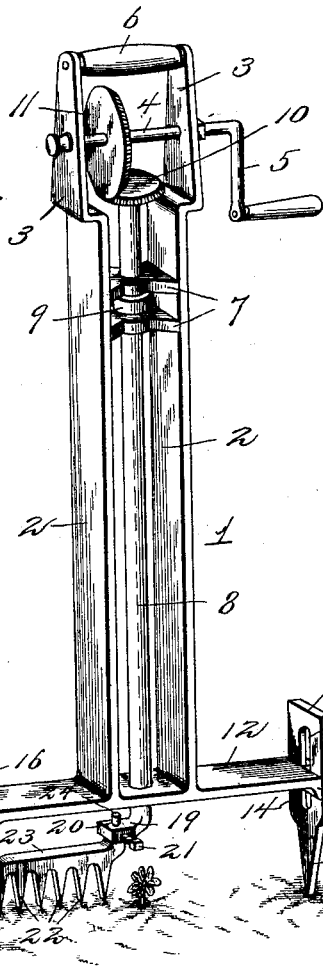
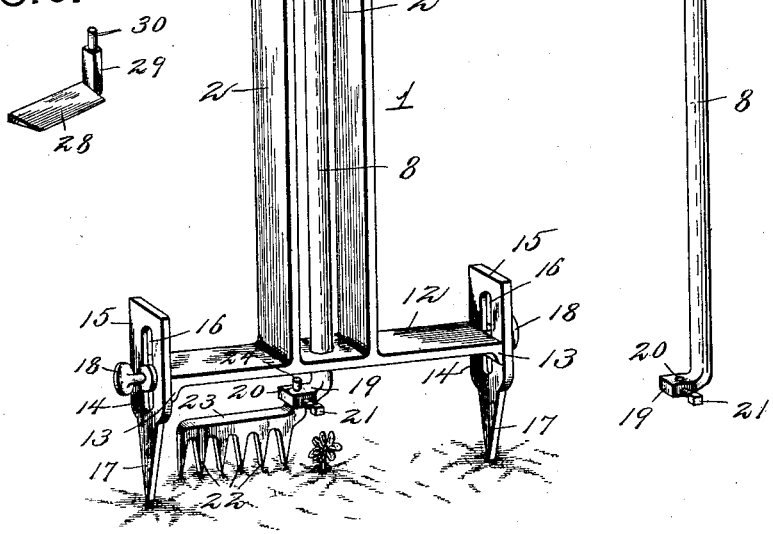
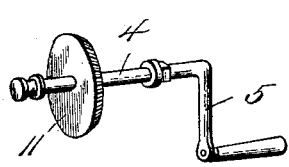
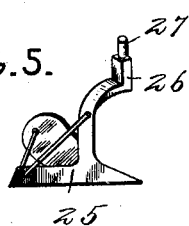
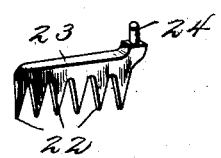
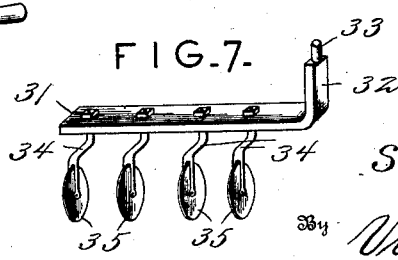
Inventor
Seth I. Titus.
Witnesses
Harry L. Amer.
Chas. S. Hyer.
By Victor J. Evans
Attorney
THE NORRIS PETERS CO., PHOTO-LITHO., WASHINGTON, D. C.

No. 731,977.

Patented June 23, 1903.

UNITED STATES PATENT OFFICE.

SETH I. TITUS, OF VILLARIDGE, ILLINOIS.

REVOLVING CULTIVATOR.

SPECIFICATION forming part of Letters Patent No. 731,977, dated June 23, 1903.

Application filed June 20, 1902. Serial No. 112,488. (No model.)

*To all whom it may concern:*

Be it known that I, SETH I. TITUS, a citizen of the United States, residing at Villaridge, in the county of Pulaski and State of Illinois, have invented new and useful Improvements in Revolving Cultivators, of which the following is a specification.

This invention relates to a hand-cultivator adapted for treating or propagating individual plants during primary growth.

The essential object of the invention is to provide a strong and durable implement or device of the class set forth which may be readily transported from one place to another and easily applied in operative relation to plants to loosen up the soil, remove weeds, or hill the same and embodying operating mechanism which can be easily actuated to cause the full implement to rotate around a plant to arrive at the result sought without injury to the plant.

A further object of the invention is to provide a device or implement capable of having several different attachments applied thereto which may be drawn closely to a plant and cultivate or otherwise treat the soil in a more efficient and expeditious manner than by the use of the ordinary cultivators which are caused to travel or move between the rows of plants in opposite directions.

With these and other objects and advantages in view the invention consists in the construction and arrangement of the several parts, which will be more fully hereinafter described and claimed and subject to a wide range in modification, as will be indicated, not only in the substitution of one kind of cultivating attachment for another with ease and facility, but also in the dimensions, proportions, and minor details without departing from the scope of the invention.

In the drawings, Figure 1 is a perspective view of a cultivator embodying the features of the invention. Fig. 2 is a similar view of a main shaft included in the organization of the improved device. Fig. 3 is a detail perspective view of an operating shaft and crank, also forming part of the organization of the device. Figs. 4, 5, 6, and 7 are detail perspective views of different forms of attachments adapted to be removably secured to the main shaft.

Similar numerals of reference are employed to indicate corresponding parts in the several views.

The numeral 1 designates a standard or upright comprising opposite parallel bars 2, having upper outstruck angular extremities 3, in which an operating-shaft 4 is horizontally disposed, and has a crank-handle 5, continued from one end thereof, a grip 6 being secured between the upper terminals of the extremities 3, whereby the entire device may be readily transported from one place to another and applied in operative position over different plants. The bars 2 near the upper extremities 3 are connected by a pair of transverse bearing-webs 7, which are spaced apart from each other, and therethrough an upright shaft 8 passes and has a stop-collar 9 thereon, which rests upon the lower web to hold the said shaft against depression beyond a predetermined extent. On the upper end of the shaft 8 is a bevel-pinion 10, which is held in continual mesh with a larger bevel-gear 11, keyed on the shaft 4 and disposed in a plane at right angles to the said pinion 10. The lower ends of the bars 2 are connected to or formed integral with a horizontal support 12, having the opposite terminals 13 slightly thickened to give bearing to opposite feet 14, the said feet having upper bodies 15 of a weight equal to the width of the terminals of the support 12 and formed with vertical slots 16, one slot being provided in each body. The lower portions 17 of the feet 14 are gradually reduced and pointed, and to hold the feet in adjustable relation to the ends of the support clamping-screws 18 are passed through the slots 16 into the ends of the support 12. The lower end of the shaft 8 is formed with an angularly-bent or horizontally-disposed head 19, having a vertical opening 20 through the center thereof and a set-screw 21 passing thereinto from one side. This head 19 is continually held at the same distance below the support 12 and is adapted to receive the shanks or tangs of various implements. The implement, shown attached to the shaft 8 and illustrated in detail by Fig.

4, is in the form of a rake-cultivator having a plurality of teeth 22 extending from the back 23, the one end of the latter being upturned and reduced to form a shank 24, which is removably inserted through the opening 20 and held against displacement when applied by the set-screw 21. Instead of this form of cultivating attachment the plow attachment 25 (shown by Fig. 5) may be substituted, the latter being in all particulars similar to an ordinary moldboard-plow of diminutive form and having an upstanding member 26, terminating in a shank 27, to removably engage the opening 20 in the head 19. In lieu of the plow attachment the scraper and cutter 28 (shown by Fig. 6) may be employed, the latter device having at one end an upwardly-projecting post 29, terminating in an upper shank 30 for removable engagement with the head 19 of the shaft 8. In lieu of the attachments which have been set forth the wheel or disk cultivator shown by Fig. 7 may be employed, and comprises a head-bar 31, with an upturned end 32, having an upper terminal shank 33 to engage the head 19 of the shaft 8, and from the bar 31 depends a series of hangers 34, in which are mounted disk cultivators 35. In operating the device thus far described either one of the attachments set forth and desired to be used is secured to the head 19 of the shaft 8, and the support 12 is adjusted any suitable distance above the ground-surface to regulate the degree of penetration of the cultivating members of the attachment held by the head through the medium of the feet 14. It will be understood that after the ground has once been loosened up on the surface the working points or edges of the attachment, such as that shown by Fig. 4, will be permitted to have but a slight penetration into the ground-surface, and if the implement or attachment shown by Fig. 6 is used it will rest flat against the surface with sufficient pressure to scrape away the weeds or other material that may be desired to be removed from the vicinity of the plant treated. After the attachments have been applied and the proper adjustments made the shaft 8 will be revolved by operating the shaft 4, the entire device being held steady over the plant by the operator. As the shaft rotates the attachment carried by the head 19 will circularly travel around the plants and thoroughly clean, scrape, or loosen up the soil or hill the latter, as may be desired.

The improved cultivating device set forth may be termed a "revolving" cultivator and will be found exceptionally useful in working individual plants and assisting in their growth without the numerous disadvantages incident to the large cultivators traveling between rows of plants in opposite directions and which frequently fail to work close enough to the individual plants.

Another advantage of the present improved device is that the soil can be worked loose or broken up close to the plant and at any depth found necessary, and, moreover, a larger area of soil adjacent to the plant can be treated without injury to the latter than when the ordinary cultivating devices are used.

It is proposed to form the several parts of the device of light material, so that it can be readily transported from one point to another to rapidly operate on different plants without unnecessarily tiring the operator, and during the operation of the device it will be understood that if the preliminary adjustment of the support above the level of the ground is not sufficiently low to cause the necessary penetration of the cultivating devices of the attachment secured to the shaft the entire machine or device may be pressed downwardly to cause the said cultivating devices to sink deeper into the soil. The improved device is also comparatively inexpensive in the cost of manufacture, and in the production of the same a number of different attachments will be furnished therewith.

Having thus fully described the invention, what is claimed as new is—

In a device of the class set forth, the combination of a vertically-disposed supporting means having a lower horizontal member extending equally outward beyond the lower termination of the said means, legs vertically movable in relation to the opposite extremities of the said horizontal member and adapted to be held rigid in adjusted position, a vertically-disposed shaft rotatably mounted in the center of the said supporting means and having its lower terminal projecting below said horizontal member and provided with a laterally-projecting extension having a vertically-arranged opening therein, the said extension being projected solely to one side of the axial line of the shaft, a cultivating device having an upwardly-projecting shank at its inner end with a reduced extremity to removably fit in the opening in the lateral extension and operated by the latter in a circular plane under the horizontal member, and means applied to said extension for removably holding the shank in firm connection with said extension, the cultivating device being movable between the legs.

In testimony whereof I affix my signature in presence of two witnesses.

SETH I. TITUS.

Witnesses:
G. E. TITUS,
T. W. WOFFORD.